United States Patent [19]

Chen-Tsai et al.

[11] Patent Number: 5,017,411

[45] Date of Patent: May 21, 1991

[54] POLYMER BLEND COMPRISING POLYCARBONATE, ACRYLONITRILE-METHYLACRYLATE COPOLYMER, AND IMIDE-ACRYLATE COPOLYMER

[75] Inventors: Charlotte H. Chen-Tsai, Murrysville, Pa.; Isaac C. Sanchez, Austin, Tex.; William L. Burton, Harrison Township, Allegheny County, Pa.

[73] Assignee: Aluminum Company of America, Pittsburgh, Pa.

[21] Appl. No.: 345,669

[22] Filed: May 1, 1989

[51] Int. Cl.$^5$ ................. C08L 69/00; C08L 51/04
[52] U.S. Cl. ..................... 428/36.6; 525/66; 525/67; 525/133; 525/148; 525/933
[58] Field of Search ............ 428/36.6; 525/133, 146, 525/67, 148, 933, 66

[56] References Cited

U.S. PATENT DOCUMENTS

| | | | |
|---|---|---|---|
| 4,217,424 | 8/1980 | Weese | 525/67 |
| 4,370,368 | 1/1983 | Hirata | 428/36.6 |
| 4,560,725 | 12/1985 | Van Bokhoven et al. | 525/67 |
| 4,564,654 | 1/1986 | Serini et al. | 525/67 |
| 4,727,117 | 2/1988 | Hallden-Abberton et al. | 525/343 |

FOREIGN PATENT DOCUMENTS 221155  9/1988  Japan ..................... 525/67

Primary Examiner—Lewis T. Jacobs
Assistant Examiner—David Buttner
Attorney, Agent, or Firm—Glenn E. Klepac

[57] ABSTRACT

A polymer blend comprising a polycarbonate, an acrylonitrile-methyl acrylate copolymer and an imide-acrylate copolymer containing acidic or anhydride groups which have been alkylated or esterified. The polymer blend has a low oxygen permeation rate, high strength, and is suitable for use as a packaging material.

18 Claims, No Drawings

POLYMER BLEND COMPRISING POLYCARBONATE, ACRYLONITRILE-METHYLACRYLATE COPOLYMER, AND IMIDE-ACRYLATE COPOLYMER

FIELD OF THE INVENTION

The present invention relates to a polymer blend suitable for use as a packaging material. More specifically, the invention relates to polymer blends having sufficient strength and gas permeation resistance to be suitable for use in food and beverage packaging.

BACKGROUND OF THE INVENTION

Polymer blends are known in the prior art. However, the prior art polymer blends are generally lacking in one or more properties necessary for use as a food or beverage packaging material. Such properties include tensile and impact strength, rigidity, gas permeation resistance, and low cost.

Hallden-Abberton et al U.S. Pat. No. 4,727,117 discloses glutarimide polymers suitable for blending with other thermoplastic materials. The patent discloses blends of the claimed polyglutarimides with polycarbonates; polycarbonate-multistage polymer blends; styrene-acrylonitrile copolymers and blends; and several other polymers. However, the patent does not suggest the three-component polymer blend claimed herein.

Various blends of polycarbonates with styrene-acrylonitrile copolymers are disclosed in Van Bokhoven et al U.S. Pat. No. 4,560,725 and Serini et al U.S. Pat. No. 4,564,654. These polymer blends do not possess adequate resistance to oxygen and carbon dioxide permeation for use as a food packaging material. Other polymer blends containing a high proportion of polycarbonate also generally lack gas permeation resistance.

It is a principal objective of the present invention to provide a polymer blend comprising a polycarbonate, an acrylonitrile-methyl acrylate copolymer, and an imide-acrylate copolymer containing acidic or anhydride groups which have been alkylated or esterified.

A related objective of the present invention is to provide a polymer blend having an adequate combination of tensile strength, rigidity, gas permeation resistance, and low cost for consideration as a food or beverage packaging material.

Additional objectives and advantages of the invention will become apparent to persons skilled in the art from the following detailed description.

SUMMARY OF THE INVENTION

In accordance with the present invention, there is provided a polymer blend comprising a polycarbonate, an acrylonitrile-methyl acrylate copolymer, and an imide-acrylate copolymer containing acidic or anhydride groups which have been alkylated or esterified.

The polycarbonate is preferably aromatic and more preferably a carbonic acid polyester of bisphenol A. The polycarbonate preferably has a melt temperature below about 230° C., more preferably below about 210° C. A particularly preferred polycarbonate has a melt temperature of about 190° C. The polycarbonate should have a melt flow rate greater than about 12 g/10 min as measured by ASTM D-1238, Condition 300/1.2. Melt flow rate for the polycarbonate is preferably greater than about 15 g/10 min.

A particularly preferred polycarbonate is sold by Mobay Corporation of Pittsburgh, Pa. under the trademark MAKROLON DP-1-1073. This polycarbonate has a density of 1.20 g/cm$^3$, a melt flow rate of 19 g/10 min, and a Vicat softening temperature of 151° C.

The acrylonitrile-methyl acrylate copolymer is preferably rubber-modified by graft polymerization of acrylonitrile and methyl acrylate in the presence of butadiene-acrylonitrile copolymers. The copolymer is preferably produced by graft polymerization of about 73–77 parts by weight acrylonitrile and about 23–27 parts by weight methyl acrylate in the presence of about 8–10 parts by weight butadiene-acrylonitrile copolymers. The copolymer should be stable in air at temperatures up to about 220° C.

A particularly preferred acrylonitrile-methyl acrylate copolymer is sold by BP Chemicals International of Cleveland, Ohio under the trademark BAREX 210. This resin has a density of about 1.15 g/cm$^3$.

The imide-acrylate copolymer is preferably an N-substituted glutarimide-acrylate copolymer made in accordance with Hallden-Abberton et al U.S. Pat. No. 4,727,117. The disclosure of said patent is incorporated herein by reference to the extent consistent with the present invention. The imide-acrylate copolymer preferably has a glass transition temperature below about 180° C., more preferably less than about 170° C.

A particularly preferred imide-acrylate copolymer is sold by Rohm and Haas Company of Philadelphia, Pa. under the trademark PARALOID. Two suitable PARALOID resins are sold under the designations PARALOID EXL-4170 (glass transition temperature 162° C.) and PARALOID EXL-4245 (glass transition temperature 143° C.). If desired, a blend of these two resins may be employed instead of only a single resin.

The imide-acrylate copolymer is preferably prepared by imidization of poly(methyl methyl acrylate). The degree of imidization is controlled so that the product is about 40–88% imidized, preferably about 50–85%. The imide-acrylate copolymer is reacted with an alkylating or esterification agent to remove acid and anhydride groups partially or completely. Some suitable alkylating agents are orthoesters such as trimethyl orthoformate and triethyl orthoformate, ketals, carbonates, and sufoxides. Some useful esterification agents are siloxanes, trialkyl, phosphates, and phosphites, alcohols, and alkyl esters.

The polymer blend preferably comprises about 25–75 wt % polycarbonate, about 20–70 wt % acrylonitrile-methyl acrylate copolymer, and about 5–20 wt % imide-acrylate copolymer. A more preferred blend comprises about 30–70 wt % aromatic polycarbonate, about 25–60 wt % acrylonitrile-methyl acrylate copolymer, and about 5–20 wt % imide-acrylate copolymer. A most preferred blend comprises about 40–60 wt % aromatic polycarbonate, about 30–50 wt % rubber-modified acrylonitrile-methyl acrylate copolymer, and about 7–15 wt % imide-acrylate copolymer.

The polymer blend of the invention has excellent resistance to gas permeation. Oxygen permeation rate for sheet samples is generally less than about 5 cc-mil/100 in$^2$-day-atm. Biaxially oriented bottles made from the polymer blend have an oxygen permeation rate of less than about 1 cc-mil/100 in$^2$-day-atm.

The polymer blend of the invention is useful for making a container in the form of a bottle, tray, cup or can. The container preferably comprises a bottle or can having a generally cylindrical, biaxially oriented wall made from the polymer blend. The container is manufactured by stretch blow molding, injection molding, blow molding, deep drawing, extrusion, thermoforming or other preferred molding and forming processes. Containers made from the polymer blend of the invention are suitable for packaging beverages and foods. They may also be used for packaging liquid fuels and solvents or as waste tanks.

DESCRIPTION OF A PREFERRED EMBODIMENT

A polymer blend in accordance with the present invention was made by blending a mixture of 50 wt % polycarbonate, 40 wt % acrylonitrile-methyl acrylate copolymer, and 10 wt % imide-acrylate copolymer. A preferred polycarbonate is MAKROLON copolymer DP-1-1073 aromatic polycarbonate from Mobay Corporation. The preferred acrylonitrile-methyl acrylate copolymer is a rubber-modified copolymer sold by BP Chemicals International under the trademark BAREX 210. The particular imide-acrylate copolymer utilized is an N-methyl glutarimide-acrylate copolymer containing acidic or anhydride groups which have been alkylated or esterified. This copolymer is sold by Rohm and Haas Company under the trademark PARALOID EXL-4245.

Appropriate quantities of the three polymers were melted and then blended to form a mixture. Temperature and shear level were adjusted to minimize degradation of the acrylonitrile-methyl acrylate copolymer and to obtain homogeneous distribution of the acrylonitrile-methyl acrylate and imide-acrylate phases in a polycarbonate matrix.

The melt blended mixture described above was chopped into granules. These granules were then remelted and injection molded into preforms which were stretch-blown into biaxially oriented bottles having a volume of about one-half liter. The bottles were tested for oxygen permeability on an Oxtran Mocon 10/50 unit. Each bottle specimen was maintained a room temperature and room humidity for a period of six days. The following Table shows oxygen permeation after six days for three bottle specimens.

TABLE I

| Specimen | Oxygen Permeation Rate (cc/pkg/yr) | Oxygen Permeation Rate (cc-mil/100 in$^2$-day-atm) |
|---|---|---|
| 1 | 0.40 | 0.16 |
| 2 | 0.44 | 0.18 |
| 3 | 0.91 | 0.38 |

The results summarized above show oxygen barrier performance for the bottles at least 10 times better than stretch-blown bottles made from polyethylene terephthalate homopolymer (PET). The oxygen permeation rate for biaxially oriented PET stretch-blown bottles is about 4–7 cc-mil/100 in$^2$-day-atm.

The bottles described above are either translucent or opaque. Transparent bottles can also be made with modifications in the materials.

Bottles made from the polymer blend of the invention have high tensile strength, preferably greater than about 10,000 psi in both axial and hoop directions. A preferred stretch-blown bottle was found to have about 13,000 psi tensile strength in both directions. Material usage is about 20% less than for PET with better mechanical properties and lower oxygen permeation. A one-half liter bottle made from the polymer blend of the present invention weighs only about 14–15 grams compared with about 17–18 grams for PET bottles having the same volume.

While the invention has been described in terms of preferred embodiments, the claims appended hereto are intended to encompass all embodiments which fall within the spirit of the invention.

What is claimed is:

1. A polymer blend comprising:
   (a) about 30–70 wt % of an aromatic polycarbonate,
   (b) about 25–60 wt % of an acrylonitrile-methyl acrylate copolymer, and
   (c) about 5–20 wt % of an imide-acrylate copolymer containing acidic or anhydride groups which have been alkylated or esterified.

2. The polymer blend of claim 1 having an oxygen permeation rate of less than about 5 cc-mil/100 in$^2$-day-atm.

3. The polymer blend of claim 1 having an oxygen permeation rate of less than about 1 cc-mil/100 in$^2$-day-atm.

4. The polymer blend of claim 1 wherein said polycarbonate has a melting temperature below about 230° C.

5. The polymer blend of claim 1 wherein said polycarbonate has a melt flow rate greater than about 12 g/10 min.

6. The polymer blend of claim 1 wherein said polycarbonate contains bisphenol A units.

7. The polymer blend of claim 1 wherein said acrylonitrile-methyl acrylate copolymer is produced by graft polymerization of acrylonitrile and methyl acrylate in the presence of butadiene-acrylonitrile copolymers.

8. The polymer blend of claim 1 wherein said acrylonitrile-methyl acrylate copolymer is produced by graft polymerization of about 73–77 parts by weight acrylonitrile and about 23–27 parts by weight methyl acrylate in the presence of about 8–10 parts by weight butadiene-acrylonitrile copolymers.

9. The polymer blend of claim 1 wherein said imide-acrylate copolymer has a glass transition temperature below about 180° C.

10. The polymer blend of claim 1 wherein said imide-acrylate copolymer is an N-substituted glutarimide-acrylate copolymer.

11. The polymer blend of claim 1 comprising about 40–60 wt % aromatic polycarbonate, about 30–50 wt % acrylonitrile-methyl acrylate copolymer and about 7–15 wt % imide-acrylate copolymer.

12. A container in the form of a bottle or can comprising a wall having an oxygen permeation rate of less than about 1 cc-mil/100 in$^2$-day-atm, said wall being made from the polymer blend of claim 1.

13. The container of claim 12 wherein said wall is biaxially oriented.

14. The container of claim 12 comprising about 50 wt % aromatic polycarbonate, about 40 wt % acrylonitrile-methyl acrylate copolymer and about 10 wt % imide-acrylate copolymer.

15. A container comprising a bottle or can having a biaxially oriented generally cylindrical wall having tensile strength in the axial and hoop direction greater than about 10,000 psi, said wall being made from a polymer blend comprising:
   (a) about 30–70 wt % aromatic polycarbonate, (b) about 25–60 wt % rubber-modified acrylonitrile-methyl acrylate copolymer, and (c) about 5–20 wt % imide-acrylate copolymer containing acidic or anhydride groups which have been alkylated or esterified.

16. The container of claim 15 wherein said acrylonitrile-methyl acrylate copolymer is produced by graft polymerization of about 73–77 parts by weight acrylonitrile and about 23–27 parts by weight methyl acrylate in the presence of about 8–10 parts by weight butadiene-acrylonitrile copolymers.

17. The container of claim 15 wherein said wall has an oxygen permeation rate of less than about 1 cc-mil/100 in$^2$-day-atm.

18. The container of claim 15 wherein said polymer blend comprises about 40–60 wt % aromatic polycarbonate, about 30–50 wt % acrylonitrile-methyl acrylate copolymer and about 7–15 wt % imide-acrylate copolymer.

* * * * *